US011851215B2

(12) United States Patent
He et al.

(10) Patent No.: US 11,851,215 B2
(45) Date of Patent: Dec. 26, 2023

(54) SYSTEMS AND METHODS FOR CALIBRATING A SYNTHETIC IMAGE ON AN AVIONIC DISPLAY

(71) Applicant: HONEYWELL INTERNATIONAL INC., Charlotte, NC (US)

(72) Inventors: Zuowei He, Shanghai (CN); Gang He, Morris Plains, NJ (US); Zhiguo Ren, Shanghai (CN); Zhong Chen, Beijing (CN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 275 days.

(21) Appl. No.: 17/332,236

(22) Filed: May 27, 2021

(65) Prior Publication Data
US 2022/0380065 A1 Dec. 1, 2022

(51) Int. Cl.
*B64F 5/60* (2017.01)
*B64D 43/00* (2006.01)
(Continued)

(52) U.S. Cl.
CPC .............. *B64F 5/60* (2017.01); *B64D 43/00* (2013.01); *B64D 45/08* (2013.01); *B64D 47/06* (2013.01);
(Continued)

(58) Field of Classification Search
CPC .......... B64F 5/60; B64D 43/00; B64D 45/08; B64D 47/06; B64D 47/08; G06V 20/582;
(Continued)

(56) References Cited

U.S. PATENT DOCUMENTS

| 6,898,331 B2* | 5/2005 | Tiana | G06T 15/503 |
| | | | 382/284 |
| 7,382,288 B1* | 6/2008 | Wilson | G08G 5/0021 |
| | | | 340/972 |

(Continued)

FOREIGN PATENT DOCUMENTS

| CN | 104501834 A | 4/2015 |
| CN | 112200847 A | 1/2021 |
| EP | 2413101 B1 | 3/2019 |

OTHER PUBLICATIONS

Danilov, Sergey, et al. "Synthetic Vision System Calibration for Conform Projection on the Pilot's Head-Up Display," The International Archives of the Photogrammetry, Remote Sensing and Spatial Information Sciences, vol. XLIII-B2-2020, 2020 XXIV ISPRS Congress (2020 edition).

(Continued)

*Primary Examiner* — Mussa A Shaawat
(74) *Attorney, Agent, or Firm* — Lorenz & Kopf LLP

(57) ABSTRACT

Systems and methods for calibrating a synthetic image on an avionic display. The method includes receiving a synthetic image frame generated by an avionic display system and a sensor image frame from a forward-facing onboard sensor system. Object recognition is performed on the sensor image frame to generate a first search region for a first Federal Aviation Administration (FAA) marking, defined as a first search region-FAA marking pair. The sensor image frame and the first search region-FAA marking pair are processed using a deep learning method (DLM) to determine for the first FAA marking of the first search region-FAA marking pair, each of: a position deviation calculation, an orientation deviation calculation, and a synthetic image distortion factor. The synthetic image frame is then updated and rendered in accordance with the position deviation calculation, the orientation deviation calculation, and the synthetic image (Continued)

distortion factor, thereby calibrating the synthetic image frame.

17 Claims, 4 Drawing Sheets

(51) Int. Cl.
| | |
|---|---|
| *B64D 45/08* | (2006.01) |
| *B64D 47/06* | (2006.01) |
| *B64D 47/08* | (2006.01) |
| *G06K 9/00* | (2022.01) |
| *G06N 3/08* | (2023.01) |
| *G06V 20/58* | (2022.01) |
| *G06V 20/56* | (2022.01) |

(52) U.S. Cl.
CPC ............... *B64D 47/08* (2013.01); *G06N 3/08* (2013.01); *G06V 20/582* (2022.01); *G06V 20/588* (2022.01)

(58) Field of Classification Search
CPC ........ G06V 20/588; G06T 2207/10016; G06T 7/70; G06N 3/08
See application file for complete search history.

(56) References Cited

U.S. PATENT DOCUMENTS

| | | | |
|---|---|---|---|
| 7,605,774 B1* | 10/2009 | Brandt | G02B 27/01 340/972 |
| 7,924,172 B1 | 4/2011 | Swearingen et al. | |
| 8,400,330 B2 | 3/2013 | He et al. | |
| 8,493,241 B2 | 7/2013 | He | |
| 8,868,265 B2 | 10/2014 | Koukol et al. | |
| 8,963,742 B1* | 2/2015 | Seah | G08G 5/0021 340/979 |
| 9,417,310 B2 | 8/2016 | Meloche et al. | |
| 9,569,848 B2* | 2/2017 | O'Dell | G06T 5/50 |
| 10,099,614 B2 | 10/2018 | Diessner | |
| 10,308,371 B1 | 6/2019 | Tiana et al. | |
| 10,440,293 B1* | 10/2019 | Ihns | B64D 47/08 |
| 11,378,988 B2* | 7/2022 | Bosworth | B64D 43/00 |
| 11,403,058 B2* | 8/2022 | Ball | G01C 23/005 |
| 2009/0040071 A1* | 2/2009 | Heyn | H05B 47/105 340/953 |
| 2010/0036548 A1* | 2/2010 | Nichols | G01C 23/00 701/4 |
| 2011/0235939 A1* | 9/2011 | Peterson | G06T 7/12 382/266 |
| 2012/0007979 A1* | 1/2012 | Schneider | G08G 5/025 348/116 |
| 2014/0097973 A1* | 4/2014 | Baudson | G01C 23/00 340/972 |
| 2014/0104693 A1* | 4/2014 | Manjon Sanchez ... | G02B 27/01 359/632 |
| 2014/0139643 A1* | 5/2014 | Hogasten | H01L 27/14623 348/48 |
| 2014/0214245 A1* | 7/2014 | Baudson | B65D 45/00 701/14 |
| 2015/0172545 A1* | 6/2015 | Szabo | H04N 7/181 348/36 |
| 2015/0189192 A1* | 7/2015 | Jonsson | H04N 5/2622 348/164 |
| 2016/0093034 A1* | 3/2016 | Beck | G06T 5/001 345/617 |
| 2016/0282120 A1 | 9/2016 | Wang et al. | |
| 2016/0325682 A1 | 11/2016 | Gupta et al. | |
| 2017/0337754 A1* | 11/2017 | Wang | G07C 5/0841 |
| 2019/0026875 A1* | 1/2019 | Yuan | G06T 5/50 |
| 2019/0043164 A1 | 2/2019 | He | |
| 2019/0114928 A1 | 4/2019 | Pinchon et al. | |
| 2019/0197995 A1 | 6/2019 | Ganille et al. | |
| 2020/0378791 A1 | 12/2020 | Hausmann et al. | |
| 2023/0074306 A1* | 3/2023 | Fye | B60K 35/00 |

OTHER PUBLICATIONS

Jennings Richard E: "FAA Advisory Circular AC 20-167A: Airworthiness Approval of Enhanced Vision System, Synthetic Vision System, Combined Vision System, and Enhanced Flight Vision System Equipment", Dec. 6, 2016 (Dec. 6, 2016), XP055800998, Retrieved from the Internet: URL:https://www.faa.gov/documentlibrary/media/advisory_circular/ac_20-167a.pdf [retrieved on May 3, 2021].

* cited by examiner

SYSTEMS AND METHODS FOR CALIBRATING A SYNTHETIC IMAGE ON AN AVIONIC DISPLAY

TECHNICAL FIELD

The following disclosure generally relates to flight display systems. More particularly, the following disclosure relates to systems and methods for calibrating a synthetic image on an avionic display.

BACKGROUND

The synthetic vision display (for example, on a head-up display (HUD)) that a pilot relies on when operating an aircraft near an airport is generated by referencing stored information about features at the airport (airport features) and their respective locations. The synthetic vision images on the synthetic vision display are constructed as a function of the aircraft position, orientation, and attitude. The airport features include signs, runway/taxiway centerlines, outlines, hold short lines, and the like. Each of these airport features has associated therewith a specific FAA marking.

A technical problem can occur when the synthetic vision display on an avionic display, renders the FAA markings for the airport, and the markings are offset, and do not match what the pilot sees in the real world. The offsets can be distracting to the pilot; even an offset of just a couple of feet can result in a noticeable mismatch from the pilot's real-world view.

Accordingly, improved flight display systems and methods that calibrate synthetic images to the real world are desired. Furthermore, other desirable features and characteristics of the disclosure will become apparent from the subsequent detailed description and the appended claims, taken in conjunction with the accompanying drawings, brief summary, technical field, and this background of the disclosure.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method for calibrating a synthetic image on an avionic display in a cockpit of an aircraft, the method including: at a controller circuit, receiving a synthetic image frame generated by an avionic display module, the synthetic image frame being forward-facing and depicting airport features surrounding an aircraft position and location; receiving a sensor image frame depicting airport features surrounding the aircraft position and location, the sensor image frame being generated by a forward-facing sensor system on the aircraft; performing object recognition on the sensor image frame to generate a first search region for a first Federal Aviation Administration (FAA) marking, defined as a first search region-FAA marking pair; processing the sensor image frame and the first search region-FAA marking pair using a deep learning method (DLM) to determine for the first FAA marking of the first search region-FAA marking pair, each of: a position deviation calculation, an orientation deviation calculation, and a synthetic image distortion factor; updating the synthetic image frame, in accordance with the position deviation calculation, the orientation deviation calculation, and the synthetic image distortion factor, thereby calibrating the synthetic image frame; and rendering the updated synthetic image frame on the avionic display.

Also provided is a system for calibrating a synthetic image on an avionic display in a cockpit of an aircraft, the system including: a controller circuit configured by programming instructions to, receive a synthetic image frame generated by an avionic display module, the synthetic image frame being forward-facing and depicting airport features surrounding the aircraft position and location; receive a sensor image frame depicting airport features surrounding the aircraft position and location, the sensor image frame being generated by a forward-facing sensor system on the aircraft; perform object recognition on the sensor image frame to generate a first search region for a first Federal Aviation Administration (FAA) marking, defined as a first search region-FAA marking pair; process the sensor image frame and the first search region-FAA marking pair using a deep learning method (DLM) to determine for the first FAA marking of the first search region-FAA marking pair, each of: a position deviation calculation, an orientation deviation calculation, and a synthetic image distortion factor; update the synthetic image frame, in accordance with the position deviation calculation, the orientation deviation calculation, and the synthetic image distortion factor, thereby calibrating the synthetic image frame; and render the updated synthetic image frame on the avionic display.

In addition, a system for calibrating a synthetic image on an avionic display in a cockpit of an aircraft is provided. The system includes: an object detection module configured to: receive a sensor image frame depicting airport features surrounding the aircraft position and location, the sensor image frame being generated by a forward-facing sensor system on the aircraft; and perform object recognition on the sensor image frame to generate a first search region for a first Federal Aviation Administration (FAA) marking, defined as a first search region-FAA marking pair; and a position correcting module operationally coupled to the object detection module and configured to process the sensor image frame, synthetic image frame, and the first search region-FAA marking pair using a deep learning method (DLM) to determine for the first FAA marking of the first search region-FAA marking pair, each of: a position deviation calculation, an orientation deviation calculation, and a synthetic image distortion factor; and an image updating module configured to: receive the position deviation calculation, the orientation deviation calculation, and the synthetic image distortion factor; receive a synthetic image frame generated by an avionic display module, the synthetic image frame being forward-facing and depicting airport features surrounding the aircraft position and location; update the synthetic image frame, in accordance with the position deviation calculation, the orientation deviation calculation, and the synthetic image distortion factor, thereby calibrating the synthetic image frame; and render the updated synthetic image frame on the avionic display.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWING FIGURES

At least one example of the present invention will hereinafter be described in conjunction with the following figures, wherein like numerals denote like elements, and:

DETAILED DESCRIPTION

Figure 1:
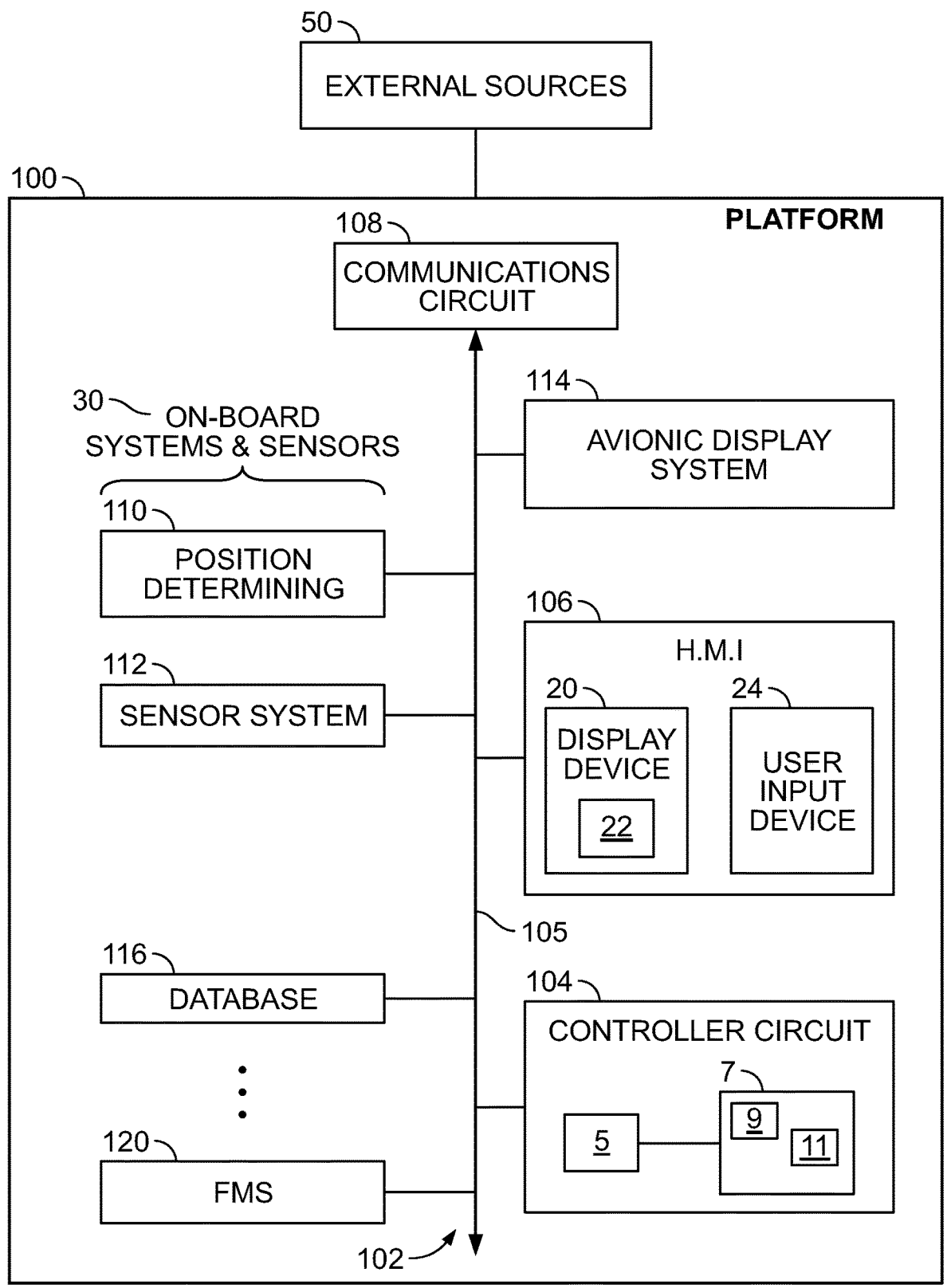
FIG. 1 shows a functional block diagram of an aircraft including various systems, including a system for calibrating a synthetic image on an avionic display in an aircraft, in accordance with exemplary embodiments of the present disclosure.

The following detailed description is merely exemplary in nature and is not intended to limit the invention or the application and uses of the invention. As used herein, the word "exemplary" means "serving as an example, instance, or illustration." Thus, any weather or flight display system or method embodiment described herein as "exemplary" is not necessarily to be construed as preferred or advantageous over other embodiments. All the embodiments described herein are exemplary embodiments provided to enable persons skilled in the art to make or use the invention and not to limit the scope of the invention which is defined by the claims.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, programmable logic arrays, application specific integrated circuits, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

As mentioned, the synthetic images presented on a head-up display (HUD) (or other synthetic display) in an aircraft are generated by referencing stored information about the airport features and using them to construct synthetic vision images as a function of the aircraft position, orientation, and attitude. For various phases of flight operations, such as approach, landing, and taxing the pilot relies on locations of specific airport features, which are identified with associated FAA markings. Examples of these features that have associated FAA markings include signs, runway/taxiway centerlines, outlines, hold short lines, and the like. During low visibility or night taxi operations, physical features within an airport environment may be difficult to see. Synthetically generated features presented at correct locations on a display greatly helps the tasks of navigating within an airport environment in these low visibility or night conditions.

A technical problem is presented when the synthetic vision display, renders the FAA markings for an airport, and the FAA markings are offset from, and do not match, what the pilot sees in the real world. The offsets can be distracting to the pilot during a cognitively demanding time; even an offset of just a couple of feet can result in a noticeable mismatch from the pilot's real-world view. The mismatch reduces pilot ability and confidence to use the system in low visibility conditions.

A technical solution is disclosed herein in the form of systems and methods for calibrating a synthetic image on an avionic display. Proposed embodiments use a Deep Learning Method (DLM) to train an object detection model to detect objects (features) associated with FAA markings in a forward-facing view sensor image. Proposed embodiments employ the DLM in the determination of a position difference and an orientation difference (the aforementioned "offsets"), and perceived distortions between objects detected in the sensor image and the same synthetic object in a HUD that was generated from a preloaded airport features database. The determined position difference, orientation difference, and distortion corrections are used to calibrate the HUD view, with the objective and result of rendering the synthetic vision image such that the airport markings and signs match to the real-world objects viewed through the HUD.

While the following exemplary embodiments are discussed in terms of an aircraft in flight, it should be appreciated that other embodiments may be employed in other contexts that construct a synthetic image based on a features database.

FIG. 1 is a block diagram of a system for calibrating a synthetic image on an avionic display in an aircraft (shortened herein to "system" 102), in accordance with an exemplary and non-limiting embodiment of the present disclosure. The system 102 may be utilized onboard a mobile platform to provide calibration of displayed synthetic images, as described herein. In various embodiments, the mobile platform is an aircraft 100, which carries or is equipped with the system 102. Aircraft 100 may be any type of vehicle that can travel through the air (i.e., without physical contact with terrain or water). As such, aircraft 100 may be any type of airplane (regardless of size or propulsion means, ranging from large, turbine-powered commercial airplanes to small, electrically-powered drones), rotorcraft (helicopter, gyrocopter), lighter-than-air vessel (hot-air balloon, blimp), or glider, for example. Aircraft 100 may be "manned" in the conventional sense that the flight crew is present within the aircraft 100, or it may be manned remotely.

As schematically depicted in FIG. 1, system 102 includes the following components or subsystems, each of which may assume the form of a single device or multiple interconnected devices: a controller circuit 104 operationally coupled to: a HMI 106 (human-machine interface); a communications circuit 108; an avionic display system 114; and one or more on-board systems and sensors 30. In various embodiments, the controller circuit 104 communicates with the other components of the system 102 via a communication bus 105.

The human-machine interface, HMI 106, may include a display device 20 and a user input device 24. In various embodiments, the HMI 106 includes at least one instance of an integration of the user input device 24 and a display device 20 (e.g., a touch screen display). In various embodiments, the HMI 106 may include a user input device 24 such as, any combination of a keyboard, cursor control device, voice input device, gesture input apparatus, or the like.

The avionic display system 114 is configured to receive and process information from various aircraft systems and databases (supplied via the communication bus 105), perform display processing and graphics processing, and to drive the display device 20 to render features in one or more avionic displays 22. The term "avionic display" is defined as synonymous with the term "aircraft-related display" and "cockpit display" and encompasses displays generated in textual, graphical, cartographical, and other formats. In various embodiments, the avionic display 22 is a primary flight display (PFD) or a navigation display. In various embodiments, the avionic display 22 can be, or include, any of various types of lateral displays and vertical situation displays on which map views and symbology, text annunciations, and other graphics pertaining to flight planning are presented for a pilot to view. The avionic display 22 generated and controlled by the system 102 can include graphical user interface (GUI) objects and alphanumerical input displays of the type commonly presented on the screens of MCDUs, as well as Control Display Units (CDUs) generally. Specifically, embodiments of avionic displays 22 include one or more two dimensional (2D) avionic displays, such as a horizontal (i.e., lateral) navigation display or vertical navigation display; and/or on one or more three dimensional (3D) avionic displays, such as a Primary Flight Display (PFD) or an exocentric 3D avionic display. With respect to the present disclosure, the avionic display includes a synthetic vision display.

Accordingly, the display device 20 is configured to include any number and type of image generating devices on which one or more avionic displays 22 may be produced. The display device 20 may embody a touch screen display. When the system 102 is utilized for a manned aircraft, display device 20 may be affixed to the static structure of the Aircraft cockpit as, for example, the aforementioned Head Up Display (HUD) unit, or a Head Down Display (HDD). Alternatively, display device 20 may assume the form of a movable display device (e.g., a pilot-worn display device) or a portable display device, such as an Electronic Flight Bag (EFB), a laptop, or a tablet computer carried into the Aircraft cockpit by a pilot.

In various embodiments, the HMI 106 further includes or has integrated therein an audio system capable of emitting speech and sounds, as well as of receiving speech input. In various embodiments, the HMI 106 may include any of: a graphical user interface (GUI), a speech recognition system, and a gesture recognition system. Via various display and graphics systems processes, the controller circuit 104 and avionics display system 114 may command and control the generation, by the HMI 106, of a variety of graphical user interface (GUI) objects or elements described herein, including, for example, buttons, sliders, and the like, which are used to prompt a user to interact with the human-machine interface to provide user input, and to activate respective functions and provide user feedback, responsive to received user input at the GUI element.

The on-board systems and sensors 30 generally include a position-determining system 110, a sensor system 112, a database 116, and a flight management system (FMS) 120.

The position-determining system 110 may include a variety of sensors and performs the function of measuring and supplying various types of aircraft status data and measurements to controller circuit 104 and other aircraft systems (via the communication bus 105) during aircraft flight. In various embodiments, the aircraft status data includes, without limitation, one or more of: inertial reference system measurements providing a location, Flight Path Angle (FPA) measurements, airspeed data, groundspeed data (including groundspeed direction), vertical speed data, vertical acceleration data, altitude data, attitude data including pitch data and roll measurements, yaw data, heading information, sensed atmospheric conditions data (including wind speed and direction data), flight path data, flight track data, radar altitude data, and geometric altitude data. The position-determining system 110 may be realized as one or more of a global positioning system (GPS), inertial reference system (IRS), or a radio-based navigation system (e.g., VHF omnidirectional radio range (VOR) or long-range aid to navigation (LORAN)), and it may include one or more navigational radios or other sensors suitably configured to support operation of the aircraft 100.

In some embodiments, the position-determining system 110 may also obtain and/or determine the heading of the aircraft 100 (i.e., the direction that aircraft 100 is traveling relative to some reference) using a magnet compass or a magnetometer, for example. The position-determining system 110 may also include a barometric altimeter such that the position of the aircraft 100 may be additionally determined with reference to a barometric altitude. In some embodiments, the GPS may alternatively or additionally provide altitude information as part of the position-determining system 110. As such, in an exemplary embodiment, the position-determining system 110 is capable of obtaining and/or determining the instantaneous position and altitude of the aircraft 100, and the position-determining system 110 generates aircraft status data for the aircraft, including the current location of the aircraft 100 (e.g., the latitude and longitude) and the altitude and heading of the aircraft 100. The position-determining system 110 may provide this aircraft status data to the controller circuit 104 and the flight management system 120 to support their operation, as described herein.

The sensor system 112, as used herein, is a forward-facing sensor system mounted on the mobile platform 100, configured to obtain real-time sensor images. During aircraft operation at an airport, the sensor system 112 provides a sensor image frame depicting airport features surrounding the aircraft position and location. Non-limiting examples of the sensor system 112 include a camera, EVS Infrared, and millimeter wave system. In some embodiments, the sensor system 112 includes a camera and associated circuitry, and the sensor image frame is then a camera image frame. In various embodiments, output from the sensor system 112 additionally includes a frame rate.

In practice, the database 116 may be realized as one or more different onboard databases, each being a computer-readable storage media or memory. In various embodiments, the database 116, stores two- or three-dimensional map data, including airport features data, geographical (terrain), buildings, bridges, and other structures, street maps, and navigational databases, which may be updated on a periodic or iterative basis to ensure data timeliness. The system 102 utilizes a storage of Federal Aviation Administration (FAA) markings, described in more detail below. In various embodiments, the FAA markings may be stored in the database 116. The data stored in the database 116 may be uploaded into the database 116 at an initialization step and then periodically updated, as directed by either a program update or by an externally triggered update.

Flight management system 120 (FMS) provides the primary navigation, flight planning, and route determination and en route guidance for the aircraft 100. The flight management system 120 may contribute aircraft status data provided to controller circuit 104, such as, the aircraft's current position, attitude, orientation, and flight direction (e.g., heading, course, track, etc.), the aircraft's airspeed, ground speed, altitude (e.g., relative to sea level), pitch, and other important flight information if such information is desired. In various embodiments, flight management system 120 may include any suitable position and direction determination devices that are capable of providing controller circuit 104 with at least an aircraft's current position (e.g., in latitudinal and longitudinal form), the real-time direction (heading, course, track, etc.) of the aircraft in its flight path, and other important flight information (e.g., airspeed, altitude, pitch, attitude, etc.). Flight management system 120 and controller circuit 104 cooperate to guide and control aircraft 100 during all phases of operation, as well as to provide other systems of aircraft 100 with flight data generated or derived from flight management system 120.

It should be appreciated that aircraft 100 includes many more additional features (systems, databases, etc.) than the illustrated systems 106-120. For purposes of simplicity of illustration and discussion, however, the illustrated aircraft 100 omits these additional features.

External sources 50 may include a weather subscription service, other subscription service, traffic monitoring service, neighbor traffic, air traffic control (ATC), ground stations, and the like.

The term "controller circuit," as appearing herein, broadly encompasses those components utilized to carry-out or otherwise support the processing functionalities of the system 102. Accordingly, in various embodiments, the controller circuit 104 can be implemented as a programmable logic array, application specific integrated circuit, system on a chip (SOC), or other similar firmware, as well as by a combination of any number of dedicated or shared processors, flight control computers, navigational equipment pieces, computer-readable storage devices (including or in addition to memory 7), power supplies, storage devices, interface cards, and other standardized components.

In various embodiments, as depicted in FIG. 1, the controller circuit 104 is realized as an enhanced computer system, having one or more processors 5 operationally coupled to computer-readable storage media or memory 7, having stored therein at least one novel firmware or software program (generally, computer-readable instructions that embody an algorithm) for carrying-out the various process tasks, calculations, and control/display functions described herein. The memory 7, may include volatile and nonvolatile storage in read-only memory (ROM), random-access memory (RAM), and keep-alive memory (KAM), for example. KAM is a persistent or non-volatile memory that may be used to store various operating variables while the processor 5 is powered down. The memory 7 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the processor 5.

During operation, the controller circuit 104, and hence the processor 5, may be programmed with and execute the at least one firmware or software program (for example, program 9 and deep learning method (DLM) 11, described in more detail below) that embodies an algorithm for receiving, processing, enabling, generating, updating and rendering, described herein, to thereby perform the various process steps, tasks, calculations, and control/display functions described herein.

Controller circuit 104 may exchange data, including real-time wireless data, with one or more external sources 50 to support operation of the system 102 in embodiments. In this case, the controller circuit 104 may utilize the communications bus 105 and communications circuit 108.

In various embodiments, the communications circuit 108 includes the hardware and software to support one or more communication protocols for wireless communication between the processor 5 and external sources, such as satellites, the cloud, communication towers and ground stations. In various embodiments, the communications circuit 108 supports wireless data exchange over a communications network, such as a public or private network implemented in accordance with Transmission Control Protocol/Internet Protocol architectures or other conventional protocol standards. Encryption and mutual authentication techniques may be applied, as appropriate, to ensure data security. In various embodiments, the communications circuit 108 supports communication with technicians, and/or one or more storage interfaces for direct connection to storage apparatuses. In various embodiments, the communications circuit 108 is integrated within the controller circuit 104.

Figure 2:
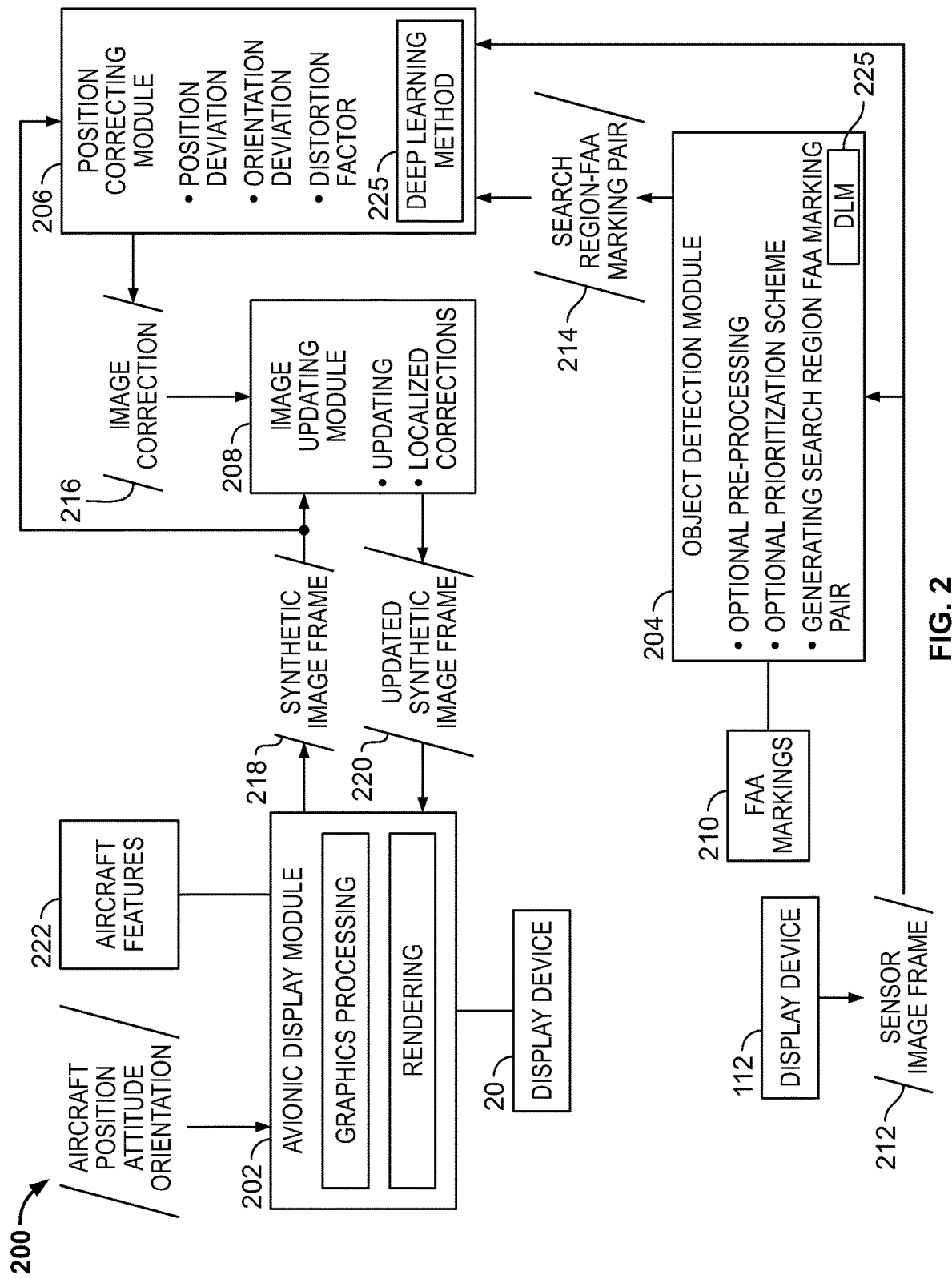
FIG. 2 is an architectural block diagram of one or more application modules that may be operating in the system for calibrating a synthetic image on an avionic display.

Turning now to FIG. 2, and with continued reference to FIG. 1, an architectural block diagram of one or more application modules that may be operating in the system 102 is described. In various embodiments, each module in FIG. 2 represents a processing block of software (e.g., program 9 and DLM 11) that is configured to cause the processor 5 to perform the tasks/processes described herein.

An avionic display module 202, as may be located in the avionic display system 114, receives aircraft position, attitude and orientation data, accesses the aircraft features database 116, performs the aforementioned display processing and graphics processing, and generates commands and controls to drive the display device 20 to render features in one or more avionic displays 22, as is conventional. Among the output generated by the avionic display module 202 is a synthetic image frame 218.

In the absence of the present invention, the synthetic image frame 218 may be rendered directly by the display device 20. However, as introduced above, the present invention converts the synthetic image frame 218 into an improved image frame, in that it utilizes sensor image frames 212 provided by an on-board sensor system 112 to calibrate the synthetic image frame 218, as follows.

An object detection module 204 embodies the object detection model introduced earlier and is configured to receive and operate on the sensor image frame 212. The object detection model includes or is integrated with a storage of FAA markings 210. The FAA markings are the aforementioned industry standard airport markings for runways, taxiways, and aprons, hold lines, for example, as can be found in FAA Advisory Circular 150/5340-1M. The object detection module 204 performs the processes of searching the sensor image frame to identify a FAA marking therein, and upon finding an FAA marking therein, the object detection module 204 generates a search region-FAA marking pair 214. The search region-FAA marking pair 214 is a narrowed-down area, or focus area, to be further processed to locate the object/feature associated with the FAA marking more accurately. In some embodiments, the object detection module 204 identifies more than one respective FAA marking in the sensor image frame, and responsive thereto, generates a respective more than one search region-FAA marking pair 214.

In some embodiments, the object detection module 204 performs a pre-process localization prior to generating the search region-FAA marking pair 214. Pre-process localization, as used herein, means a process of sub-dividing the sensor image frame 212 into a pre-programmed number of areas or regions (e.g., four quadrants), and then separately and concurrently searching each of the regions or quadrants for FAA markings. In some embodiments, the object detection module 204 generates the search region-FAA marking pair 214 by additionally applying a prioritization scheme to one or more FAA markings identified in the sensor image frame, and only a FAA marking that exceeds a pre-programmed priority threshold results in the output search region-FAA marking pair 214. In some embodiments, the prioritization scheme can be separately applied to each of one or more regions or quadrants.

A position correcting module 206 may receive as input the search region-FAA marking pair, the sensor image frame 21, and the synthetic image frame 218, and perform the process of determining or generating at least one image correction 216 based on this input. In an embodiment, the image correction 216 includes a position deviation, wherein a position deviation is a cartesian or X-Y difference between the FAA marking position. In various embodiments, an image correction 216 may include an angular rotation in degrees.

After the airport FAA markings and signs have been detected on the real time sensor image frame 212, a 2D (i.e., cartesian) position of the FAA marking outline in the image is used to calculate the position deviation between the sensor image frame 212 and the synthetic image frame 218. In various embodiments, a maximum position deviation is identified based on an integrity requirement of the system 102, which means when the calculated position deviation exceeds this maximum position deviation, the respective FAA marking should not be used to calibrate the synthetic image on the avionic display. This is to ensure that the system 102 integrity not be impacted by the calibration.

In an embodiment, the image correction 216 includes an orientation deviation, wherein an orientation deviation is an angular or rotational difference in the FAA marking position. In an embodiment, the image correction 216 includes a distortion factor, wherein a distortion factor is a correction for a sub-area in an image to account for that sub-area having a different scaling, compression, or shifting of image elements/objects compared to other sub-areas making up the entire image area. In various embodiments, the image correction 216 includes two or more of: a position deviation, an orientation deviation, and a distortion factor.

In embodiments of the object detection module 204 and the position correcting module 206, the processor 5 harnesses the power of artificial intelligence (AI) and machine learning (ML) or a Deep Learning Method (DLM) 225. The DLM 225 may be employed to train the object detection model to detect the objects/features associated with FAA markings (the airport markings and signs, such as runway/taxiway centerlines, outlines, hold shorts, etc.) from images provided by the forward-facing sensor system 112.

By comparing the position and orientation between an object detected in the sensor image frame to that of the respective object in the synthetic image frame, which originated from the airport features database 116, image corrections can be determined, and the synthetic image on an avionic display in a cockpit of an aircraft (e.g., HUD view) can be calibrated based on those image corrections. The goal or target of the system 102 is to render the synthetic vision airport FAA markings and signs such that they match the real-world objects viewed through HUD. With the synthetic image calibrated, and learned parameters/behaviors (from the DLM) stored in the onboard system, the subsequent synthetic image display is mostly error-free with respect to the perceived real world object positions. The DLM 225, once trained, advantageously provides near real-time feedback related to position and orientation deviations and distortion. The use of the DLM 225 saves computational time, reduces cycle time, and provides high utility high integrity, real-time feedback.

In various embodiments, the position correcting module 206 identifies an object/feature in the sensor image frame, and determines an object position for the object, as a function of a predefined set of rules encoded in the program 9. In these embodiments, rendering the updated synthetic image frame 220 further includes (i) using the object position to visually distinguish the object within the updated synthetic image frame, and (ii) deleting a synthetic rendering of the object in the updated synthetic image frame.

The DLM 225 may be implemented in various commercially available ways. For example, the DLM 225 can be a Region based Convolutional Neural Networks (R-CNN), Single Shot Detector (SSD), or YOLO. In an embodiment, the DLM 225 is a convolutional neural network (CNN) with multiple hidden convolution layers. One example of training the DLM 225 will be described in more detail below.

An image updating module 208 may be configured to receive the synthetic image frame 218, from the avionic display module 202, and perform an updating process as a function of the image correction 216. In various embodiments, the image updating module 208 performs the updating process locally, meaning that each region or quadrant is separately and independently updated. At the completion of the image updating process, an updated synthetic image frame 220 is generated. The updated synthetic image frame 220 may be provided back to the avionic display module 202, which, responsive thereto, will perform graphics processing render the updated synthetic image frame 220 on the display device 20. The updated synthetic image frame 220 is a calibrated synthetic image for the avionic display in the cockpit of the aircraft.

Figure 3:
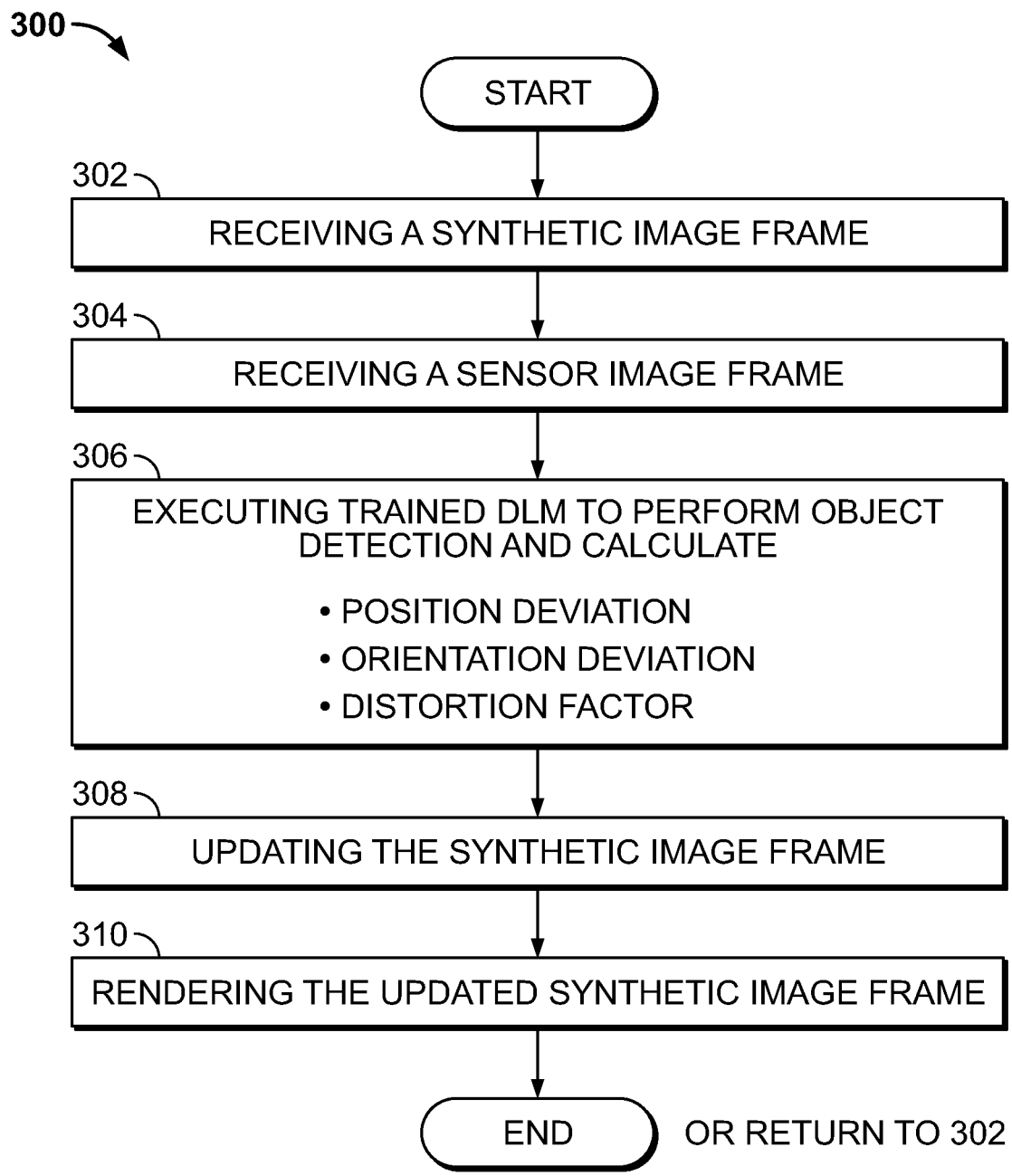
FIG. 3 is a flowchart illustrating a method for calibrating a synthetic image on an avionic display, in accordance with exemplary embodiments of the present disclosure.

Turning now to FIG. 3, and with continued reference to FIGS. 1-2, a flowchart of a method 300 for calibrating a synthetic image on an avionic display in a cockpit of an aircraft is described, in accordance with exemplary embodiments of the present disclosure. For illustrative purposes, the following description of method 300 may refer to elements mentioned above in connection with FIGS. 1-2. In practice, portions of method 300 may be performed by different components of the described system. It should be appreciated that method 300 may include any number of additional or alternative tasks, the tasks shown in FIG. 3 need not be performed in the illustrated order, and method 300 may be incorporated into a more comprehensive procedure or method having additional functionality not described in detail herein. Moreover, one or more of the tasks shown in FIG. 3 could be omitted from an embodiment of the method 300 as long as the intended overall functionality remains intact.

At 302, the avionic display module 202 is generating the synthetic image frame 218 described above. In doing so, the avionic display module 202 is receiving aircraft position, attitude, and orientation information, such as from the position-determining system 110, and is also referencing a storage of aircraft features 222. At 304, the system 102 receives a sensor image frame 212. As mentioned, in various embodiments, the sensor image frame 212 is a camera frame.

At 306, the system 102 may execute the trained DLM 225 to perform object detection and to calculate one or more image corrections 216. As mentioned, image corrections 216 may be a combination of a position deviation, an orientation deviation, and a distortion factor. At 308, the system 102 performs the task of updating the synthetic image frame 218 as a function of the one or more image corrections 216. At 310, the system 102 performs the task of rendering the updated synthetic image frame 220 on the display device 20.

In various embodiments, the method 300 can keep cycling from 310 back to 302 until the aircraft lands.

Figure 4:
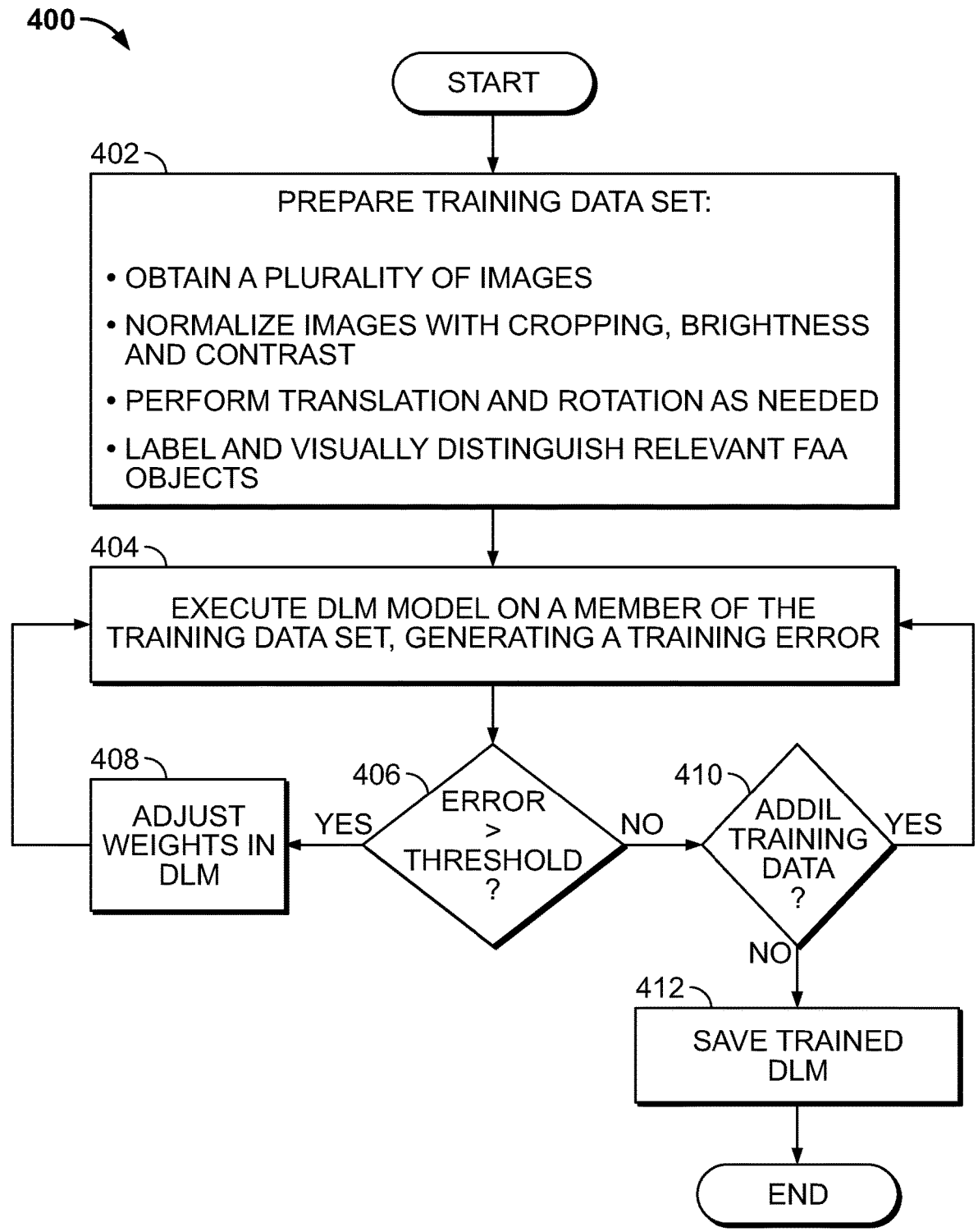
FIG. 4 is an example method for training the deep learning method (DLM), in accordance with some embodiments.

As mentioned, the DLM 225 may be implemented using various conventionally available techniques. FIG. 4 provides an example method for training the DLM 225, when the DLM 225 is implemented as a CNN. At 402 a training data set is developed. The training data set includes a plurality of sensor images taken from the sensor system 112, each sensor image including one or more FAA markings. In an example, there are 20 to 50 thousand images, or members, of the training data set. The images are normalized to make them suitable for comparison. Normalizing includes cropping the images to be focused on the relevant FAA markings, and potentially adjusting contrast and brightness, lower visibility induced image feature degradations, adjustment of field of views matching typical aircraft installations, movement and vibration induced image feature smearing. Images may also have to be translated and/or rotated to account for a perspective that is a function of the mounting of the sensor system 112 on the aircraft. In another data preparation step, the FAA markings in the training data images are visually distinguished (e.g., highlighted) and labeled.

In various embodiments, the CNN is trained using a validation data set that is the same as the training data set.

At 404, the DLM 225 is executed on a member of the training data set, generating a training error. At 406, the training error is compared to a threshold, and if the training error exceeds the threshold, weights in the DLM 225 may be adjusted at 408 before returning to 404 to execute the DLM again. When the training error is finally below the threshold at 406, the method proceeds to check whether there is another member of the training data set available at 410. When there is another member of the training data set available at 410, the method 400 proceeds to execute the DLM on the next member at 404. Steps 404-410 are performed for all the members of the training data set, and when there are no more members, at 410, the trained DLM 225 is saved at 412.

In various embodiments, one pass over the complete training data set is called an epoch, in each epoch, a training error is generated, and the CNN is trained by comparing the training error to an error threshold and backpropagating when the training error exceeds the error threshold. Backpropagating, as used herein, includes adjusting weights in neurons of an encoder in the CNN based on a comparison of the training error to its previous value.

Accordingly, the present disclosure has provided several embodiments of systems and methods for calibrating a synthetic image on an avionic display. Proposed embodiments use a Deep Learning Method (DLM) to train an object detection model to detect FAA markings in a forward-facing view sensor image. Proposed embodiments determine a position difference and an orientation difference and use the determined position difference and orientation difference to calibrate the HUD view. With the calibrated HUD view, the synthetic vision image is rendered such that the airport markings and signs match to the real-world objects viewed through the HUD. Accordingly, the disclosed systems and methods provide an objectively improved HMI over available avionics display systems.

Although an exemplary embodiment of the present disclosure has been described above in the context of a fully-functioning computer system (e.g., system 102 described above in conjunction with FIG. 1), those skilled in the art will recognize that the mechanisms of the present disclosure are capable of being distributed as a program product (e.g., an Internet-disseminated program 9 and DLM 11 or software application) and, further, that the present teachings apply to the program product regardless of the particular type of computer-readable media (e.g., hard drive, memory card, optical disc, etc.) employed to carry-out its distribution.

Terms such as "comprise," "include," "have," and variations thereof are utilized herein to denote non-exclusive inclusions. Such terms may thus be utilized in describing processes, articles, apparatuses, and the like that include one or more named steps or elements but may further include additional unnamed steps or elements.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for calibrating a synthetic image on an avionic display in a cockpit of an aircraft, the method comprising:

at a controller circuit,
receiving a synthetic image frame generated by an avionic display module, the synthetic image frame being forward-facing and depicting airport features surrounding an aircraft position and location;
receiving a sensor image frame depicting airport features surrounding the aircraft position and location, the sensor image frame being generated by a forward-facing sensor system on the aircraft;
sub-dividing the synthetic image frame into two or more regions;
performing object recognition separately and concurrently on the two or more regions to generate a first search region for a first Federal Aviation Administration (FAA) marking, defined as a first search region-FAA marking pair, and a second search region-FAA marking pair of a respective two or more search region-FAA marking pairs;
processing the sensor image frame, the first search region-FAA marking pair, and the second search region-FAA marking pair, using a deep learning method (DLM), to determine, for the first FAA marking of the first search region-FAA marking pair and for a second FAA marking associated with the second search region-FAA marking pair, each of: a position deviation calculation, an orientation deviation calculation, and a synthetic image distortion factor;
updating the synthetic image frame, in accordance with (i) the position deviation calculation, the orientation deviation calculation, and the synthetic image distortion factor of the first FAA marking and (ii) the position deviation calculation, the orientation deviation calculation, and the synthetic image distortion factor of the second FAA marking, thereby calibrating the synthetic image frame; and rendering the updated synthetic image frame on the avionic display.

2. The method of claim 1, wherein the DLM is a convolutional neural network (CNN).

3. The method of claim 1, further comprising:
identifying an object in the sensor image frame;
determining an object position for the object, as a function of a predefined set of rules; and
wherein rendering the updated synthetic image frame further includes (i) using the object position to visually distinguish the object within the updated synthetic image frame, and (ii) deleting a synthetic rendering of the object in the updated synthetic image frame.

4. The method of claim 1, further comprising:
identifying one of the first search region-FAA marking pair and the second search region-FAA marking pair as a highest priority search region-FAA marking pair by referencing a prioritization scheme; and
processing the sensor image frame and the highest priority search region-FAA marking pair using the deep learning method (DLM) to determine a position deviation calculation and an orientation deviation calculation associated with a highest priority FAA marking indicated by the highest priority search region-FAA marking pair.

5. A system for calibrating a synthetic image on an avionic display in a cockpit of an aircraft, the system comprising:
a controller circuit configured by programming instructions to,
receive a synthetic image frame generated by an avionic display module, the synthetic image frame being forward-facing and depicting airport features surrounding the aircraft position and location;
receive a sensor image frame depicting airport features surrounding the aircraft position and location, the sensor image frame being generated by a forward-facing sensor system on the aircraft;
sub-divide the synthetic image frame into two or more regions;
perform object recognition separately and concurrently on the two or more regions to generate a first search region for a first Federal Aviation Administration (FAA) marking, defined as a first search region-FAA marking pair, and a second search region-FAA marking pair of a respective two or more search region-FAA marking pairs;
process the sensor image frame, the first search region-FAA marking pair, and the second search region-FAA marking pair, using a deep learning method (DLM), to determine, for the first FAA marking of the first search region-FAA marking pair and for a second FAA marking associated with the second search region-FAA marking pair, each of: a position deviation calculation, an orientation deviation calculation, and a synthetic image distortion factor;
update the synthetic image frame, in accordance with (i) the position deviation calculation, the orientation deviation calculation, and the synthetic image distortion factor of the first FAA marking and (ii) the position deviation calculation, the orientation deviation calculation, and the synthetic image distortion factor of the second FAA marking, thereby calibrating the synthetic image frame; and
render the updated synthetic image frame on the avionic display.

6. The system of claim 5, wherein the controller circuit is further configured to:
identify an object in the sensor image frame;
determine an object position for the object, as a function of a predefined set of rules; and
wherein rendering the updated synthetic image frame further includes (i) using the object position to visually distinguish the object within the updated synthetic image frame, and (ii) deleting a synthetic rendering of the object in the updated synthetic image frame.

7. The system of claim 5, wherein the DLM is a convolutional neural network (CNN).

8. The system of claim 7, wherein the CNN is trained using a training data set of a plurality of sensor images.

9. The system of claim 8, wherein the CNN is trained using a validation data set that is the same as the training data set.

10. The system of claim 9, wherein one pass over the complete training data set is called an epoch, in each epoch, a training error is generated, and the CNN is trained by comparing the training error to an error threshold and backpropagating when the training error exceeds the error threshold.

11. The system of claim 5, wherein the controller circuit is further configured to:
identify one of the first search region-FAA marking pair and the second search region-FAA marking pair as a highest priority search region-FAA marking pair by referencing a prioritization scheme; and
process the sensor image frame and the highest priority search region-FAA marking pair using a deep learning method (DLM) to determine a position deviation calculation and an orientation deviation calculation associated with a highest priority FAA marking indicated by the highest priority search region-FAA marking pair.

12. A system for calibrating a synthetic image on an avionic display in a cockpit of an aircraft, the system comprising:
an object detection module configured to:
receive a sensor image frame depicting airport features surrounding the aircraft position and location, the sensor image frame being generated by a forward-facing sensor system on the aircraft; and
perform object recognition on the sensor image frame to generate a first search region for a first Federal Aviation Administration (FAA) marking, defined as a first search region-FAA marking pair; and
a position correcting module operationally coupled to the object detection module and configured to process the sensor image frame and the first search region-FAA marking pair using a deep learning method (DLM) to determine for the first FAA marking of the first search region-FAA marking pair, each of: a position deviation calculation, an orientation deviation calculation, and a synthetic image distortion factor; and
an image updating module configured to:
receive the position deviation calculation, the orientation deviation calculation, and the synthetic image distortion factor;
receive a synthetic image frame generated by an avionic display module, the synthetic image frame being forward-facing and depicting airport features surrounding the aircraft position and location;
update the synthetic image frame, in accordance with the position deviation calculation, the orientation deviation calculation, and the synthetic image distortion factor, thereby calibrating the synthetic image frame; and render the updated synthetic image frame on the avionic display, wherein the object detection module is further configured to:

sub-divide the synthetic image frame into two or more regions prior to performing object recognition;

perform object recognition separately and concurrently on the two or more regions to generate the first search region-FAA marking pair and a second search region-FAA marking pair of a respective two or more search region-FAA marking pairs;

process the sensor image frame, the first search region-FAA marking pair and the second search region-FAA marking pair, using the deep learning method (DLM) to determine the position deviation calculation and the orientation deviation calculation for the first FAA marking and a position deviation calculation and an orientation deviation calculation for a second FAA marking associated and with the second search region-FAA marking pair; and the image updating module is further configured to update the synthetic image frame in accordance with the position deviation calculation and the orientation deviation calculation of the second FAA marking.

13. The system of claim 12, wherein the object detection module is further configured to:

identify an object in the sensor image frame;

determine an object position for the object, as a function of a predefined set of rules; and cause the rendering of the updated synthetic image frame to further include (i) using the object position to visually distinguish the object within the updated synthetic image frame, and (ii) deleting a synthetic rendering of the object in the updated synthetic image frame.

14. The system of claim 12, wherein the DLM is a convolutional neural network (CNN).

15. The system of claim 14, wherein the CNN is trained using a training data set of a plurality of sensor images.

16. The system of claim 15, wherein the CNN is trained using a validation data set that is the same as the training data set.

17. The system of claim 12, wherein the object detection module is further configured to:

identify one of the first search region-FAA marking pair and the second search region-FAA marking pair as a highest priority search region-FAA marking pair by referencing a prioritization scheme; and process the sensor image frame and the highest priority search region-FAA marking pair using a deep learning method (DLM) to determine a position deviation calculation and an orientation deviation calculation associated with a highest priority FAA marking indicated by the highest priority search region-FAA marking pair.

* * * * *